US012244095B2

(12) United States Patent
Wahl et al.

(10) Patent No.: US 12,244,095 B2
(45) Date of Patent: Mar. 4, 2025

(54) TETHERED CONNECTOR ASSEMBLY

(71) Applicant: Microsoft Technology Licensing, LLC, Redmond, WA (US)

(72) Inventors: James David Wahl, Woodinville, WA (US); Xianming Huang, Shenzhen (CN); Royce Dean Chang, Seattle, WA (US); Colin Kelong Zhao, Shenzhen (CN); Jonne Aapi Harju, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 17/440,727

(22) PCT Filed: Apr. 3, 2019

(86) PCT No.: PCT/CN2019/081231

§ 371 (c)(1),
(2) Date: Sep. 17, 2021

(87) PCT Pub. No.: WO2020/199154

PCT Pub. Date: Oct. 8, 2020

(65) Prior Publication Data

US 2022/0173548 A1 Jun. 2, 2022

(51) Int. Cl.

| | |
|---|---|
| ***H01R 13/60*** | (2006.01) |
| ***H01R 13/62*** | (2006.01) |
| ***H01R 33/76*** | (2006.01) |

(52) U.S. Cl.

CPC ......... *H01R 13/60* (2013.01); *H01R 13/6205* (2013.01); *H01R 33/7664* (2013.01)

(58) Field of Classification Search

CPC . H01R 13/60; H01R 13/6205; H01R 33/7664
See application file for complete search history.

(56) References Cited

U.S. PATENT DOCUMENTS 5,547,388 A 8/1996 Hill
5,667,398 A * 9/1997 Kidd .................... H01R 13/629 439/923

(Continued)

FOREIGN PATENT DOCUMENTS

CN 1684315 A 10/2005
CN 1695275 A 11/2005

(Continued)

OTHER PUBLICATIONS

"Extended European Search Report in European Application No. 19922405.6", Mailed Date: Oct. 19, 2022, 15 Pages.

(Continued)

*Primary Examiner* — Thanh Tam T Le
(74) *Attorney, Agent, or Firm* — ArentFox Schiff LLP

(57) ABSTRACT

A connector assembly including a first intermediate connector member associated with a first device and having a first connector interface and a second intermediate connector having a second connector interface. The first intermediate connector and the second intermediate connector are movable between an interfaced state in which the first connector interface is in contact with the second connector, and a tethered state in which the first connector interface is spaced apart from the second connector interface. The connector assembly further includes a tether member connecting the first intermediate connector and the second intermediate connector in the tethered state. The tether may include a flexible body configured to control a path along at least an axis of either the first intermediate connector or the second intermediate connector during movement from the interfaced state to the tethered state.

22 Claims, 13 Drawing Sheets

(56) References Cited

U.S. PATENT DOCUMENTS

| | | | | | |
|---|---|---|---|---|---|
| 5,921,783 | A * | 7/1999 | Fritsch | H01R 13/703 439/700 |
| 7,287,994 | B1 * | 10/2007 | Liao | H01R 31/06 439/352 |
| 7,311,526 | B2 * | 12/2007 | Rohrbach | G06F 1/18 439/39 |
| 7,465,176 | B2 * | 12/2008 | Liao | H01R 31/06 439/172 |
| 7,625,212 | B2 * | 12/2009 | Du | H01R 13/6205 439/39 |
| 7,775,801 | B2 * | 8/2010 | Shiff | H01R 13/6205 439/700 |
| 7,942,691 | B1 * | 5/2011 | McSweyn | H01R 13/60 439/501 |
| 8,167,624 | B2 * | 5/2012 | Hartlef | H01R 13/6315 439/39 |
| 8,870,601 | B2 * | 10/2014 | Lee | H01R 31/06 439/131 |
| 8,936,483 | B2 * | 1/2015 | Saunders | H01R 13/627 439/351 |
| 9,077,105 | B2 * | 7/2015 | Kim | H01R 13/6205 |
| 9,197,292 | B2 * | 11/2015 | Benjestorf | H04B 5/0093 |
| 9,267,572 | B2 * | 2/2016 | Barker | H01R 13/60 |
| 9,454,066 | B2 | 9/2016 | O'Neill et al. | |
| 9,614,319 | B2 * | 4/2017 | Blunt | F16G 11/025 |
| 9,665,125 | B2 * | 5/2017 | Browning | G06F 1/1654 |
| 10,096,938 | B2 * | 10/2018 | McClelland | H01R 13/629 |
| 10,381,782 | B2 * | 8/2019 | Byrne | H01R 13/641 |
| 10,483,688 | B2 * | 11/2019 | Wrisley | H01R 13/665 |
| 10,817,453 | B2 * | 10/2020 | Abdul-Razzak | G06F 1/1632 |
| 10,950,991 | B2 * | 3/2021 | Di Palma | H01R 33/90 |
| 10,998,742 | B2 * | 5/2021 | Yu | H02J 7/0042 |
| 11,223,151 | B2 * | 1/2022 | Underwood | H01R 13/04 |
| 11,245,222 | B2 * | 2/2022 | Chatterton | H01R 13/42 |
| 11,289,849 | B2 * | 3/2022 | Jani | H01R 13/6205 |
| 2008/0139050 | A1 | 6/2008 | Liao | |
| 2012/0014043 | A1 | 1/2012 | Dong et al. | |
| 2012/0178310 | A1 | 7/2012 | Ekchian | |
| 2012/0295470 | A1 | 11/2012 | Nagasaka | |
| 2014/0220793 | A1 | 8/2014 | Yen | |
| 2016/0363143 | A1 | 12/2016 | Druce et al. | |
| 2018/0115128 | A1 | 4/2018 | Choi et al. | |
| 2018/0365949 | A1 | 12/2018 | Fawcett et al. | |

FOREIGN PATENT DOCUMENTS

| | | | |
|---|---|---|---|
| CN | 101056323 | A | 10/2007 |
| CN | 201601922 | U | 10/2010 |
| CN | 201609001 | U | 10/2010 |
| CN | 101981758 | A | 2/2011 |
| CN | 202268586 | U | 6/2012 |
| CN | 203883284 | U | 10/2014 |
| CN | 104184006 | A | 12/2014 |
| CN | 105938967 | A | 9/2016 |
| CN | 206574937 | U | 10/2017 |
| CN | 107611710 | A | 1/2018 |
| CN | 108324566 | A | 7/2018 |
| CN | 109417850 | A | 3/2019 |
| EP | 3048676 | A1 | 7/2016 |
| TW | M460433 | U | 8/2013 |

OTHER PUBLICATIONS

International Search Report and Written Opinion issued in corresponding International Application No. PCT/CN2019/081231 dated Dec. 27, 2019.

AmPen Stylus, Capacitive Stylus Ultra-Sensitive for iPad Air, iPad 2/3/4, iPad Pro, Any iPhone, Nexus 5x/6P, Galaxy Tab E/Tab A/Tab 8, Galaxy S6/S6 Edge/S5, with Lanyard, Silver, Non-Replaceable Tip; www.amazon.com; Jan. 7, 2019.

"First Office Action and Search Report Issued in Chinese Patent Application No. 201980091389.6", Mailed Date: Apr. 28, 2023, 21 Pages.

"Second Office Action Issued in Chinese Patent Application No. 201980091389.6", Mailed Date: Oct. 27, 2023, 8 Pages.

Communication Pursuant to Rules 70(2) and 70(2) Received in European Application No. 19922405.6 mailed on Nov. 8, 2022, 1 page.

Office Action Received for Chinese Application No. 201980091389.6, mailed on Jan. 16, 2024, 8 pages (English Translation Provided).

* cited by examiner

TETHERED CONNECTOR ASSEMBLY

CROSS-REFERENCE TO RELATED APPLICATION

This application is a 35 U.S.C. § 371 National Phase of PCT Application No. PCT/CN2019/081231, filed Apr. 3, 2019, entitled "TETHERED CONNECTOR ASSEMBLY," the disclosure of which is incorporated herein by reference.

FIELD OF THE INVENTION

The present disclosure relates generally to a connector assembly and methods for providing a connector assembly for connecting a first device to a second device, and more specifically, to a removable connector assembly having a hidden tether.

BACKGROUND

Host devices may be compatible with or usable with accessories and/or other devices that may be connectable to the host device. Frequently these devices are connected via a physical connection in order to stably mount the accessory and/or other device to the host device. The host device and accessory and/or other device may further be connected via an electrical connection. A connector may provide a physical connection or electrical connection or both.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In accordance with one aspect of the disclosure, an assembly is disclosed. The assembly may include a first intermediate connector member associated with a first device and having a first connector interface and a second intermediate connector having a second connector interface. The first intermediate connector and the second intermediate connector may be movable between an interfaced state in which the first connector interface is in contact with the second connector, and a tethered state in which the first connector interface is spaced apart from the second connector interface. The connector assembly may further include a tether member connecting the first intermediate connector and the second intermediate connector in the tethered state. The tether may include a flexible body configured to control a path along at least an axis of either the first intermediate connector or the second intermediate connector during movement from the interfaced state to the tethered state.

In accordance with another aspect of the disclosure, a connector for removably connecting a first device to a second device is disclosed. The connector may include a first intermediate connector member associated with a first device and having a first connector interface and a second intermediate connector having a second connector interface and a device interface. The first intermediate connector and the second intermediate connector may be movable between an interfaced state in which the first connector interface is in contact with the second connector interface state and a tethered state in which the first connector interface is spaced apart from the second connector interface. The connector may further include a tether member connecting the first intermediate connector and the second intermediate connector in the tethered state, and a second device interface. The device interface may be connectable to the second device interface of the second device so as to provide a connected state and a separated state. The device interface contacts the second device interface in the connected state and is independent of the second device interface in the separated state.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The features of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, will be best understood by reference to the following detailed description of illustrative aspects of the disclosure when read in conjunction with the accompanying drawings, wherein:

DETAILED DESCRIPTION

Figure 1:
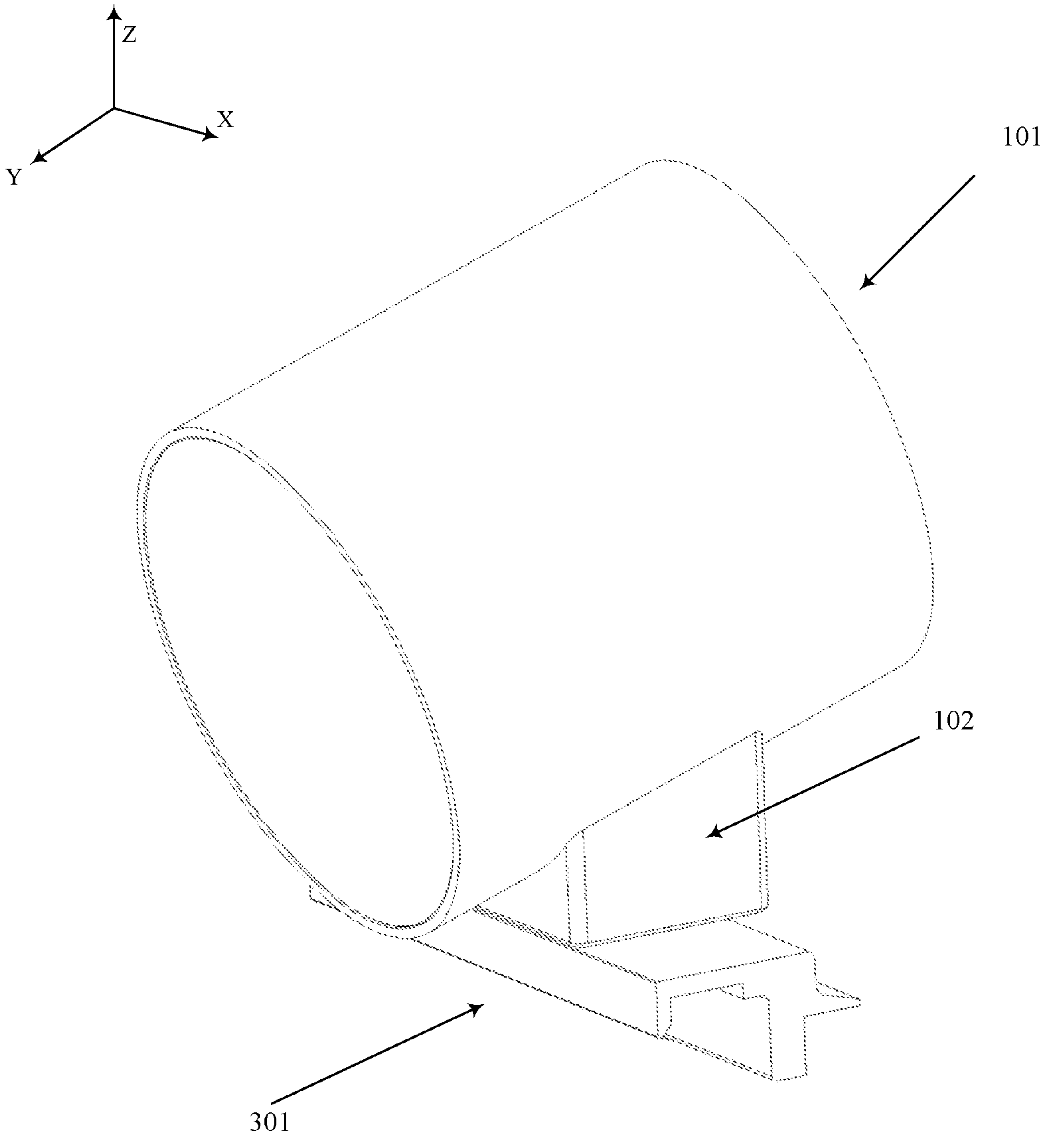
FIG. 1 is a front perspective view of a connector assembly in accordance with one aspect of the disclosure.

The following includes definitions of selected terms employed herein. The definitions include various examples and/or forms of components that fall within the scope of a term and that may be used for implementation. The examples are not intended to be limiting. Further, it will be obvious to one skilled in the art that the present disclosure may be practiced without these specific details. In other instances, well-known methods, procedures, and components have not been described in detail so as to not unnecessarily obscure aspects of the present disclosure. For purposes of the disclosure, directional terms are expressed generally with relation to a standard frame of reference when accessories and/or other devices are connected to a host device.

The present disclosure is related to an improved connector system useable to connect an accessory or other device to a host device. An accessory or other device may comprise any one of, but is not limited to: a camera, a battery, an adapter, a microphone, a speaker, a display device, a keyboard, or any other input device, to name a few examples. Throughout the disclosure, the terms “other device,” “accessory,” and “first device” may be used interchangeably.

A host device may comprise any one of: a monitor, an all-in-one desktop computer, a tablet, a camera, a video recording device, or a mobile phone, to name a few examples. Throughout the disclosure, the terms “host device” and “second device” may be used interchangeably.

When providing a physical and/or electrical connection between an accessory to a host device, it may be desirable to provide additional protection and assurance that the accessory is not dropped if it accidentally becomes detached from the host device. For example, an accessory (e.g., a camera) may be mounted to the top of and thus may protrude from the top of a host device (e.g., a display). The camera may be mounted to the display solely to provide a physical connection between the display and the camera or may also include an electrical connection for transferring signals and/or current between the camera and the display. In order to prevent damage to the camera, the connection between the camera and display may be designed to cause the camera to break away from the display when excessive force is applied to the camera—which may be the result of a user accidentally bumping the camera or accidentally hitting the camera against another object. However, known connectors can suffer various shortcomings. One shortcoming is that if the camera breaks away from the display, the camera falls, which could cause damage to the camera due to contact of the camera with the ground or other surface, for example. Further, the camera may contact the display once the camera has broken away, which may cause damage to the display, camera, or both.

The current disclosure may overcome one or more of the aforementioned deficiencies while still providing a compact connector assembly that is visually appealing to a consumer. In implementing the current disclosure in the form of the example camera and display above, the disclosed connector assembly allows the camera to be fully disconnected from the display but also allows for the camera to remain connected to the display in a tethered state if excessive force is imparted on the camera. Thus, one example of the disclosed connector assembly provides a controlled break away of the camera from the display, which helps to prevent damage to the camera and/or the display when the camera is disconnected. Further, by controlling the path of the camera with relation to the display when the camera is broken away to a tethered state, the disclosed connector assembly may provide a controlled disconnect path at an electrical connection between the camera and the display, which may also prevent potential damage to the electrical connection. Once the camera is in the tethered state, the current disclosure allows a user to easily re-connect the camera to the display, for example.

Referring to FIGS. 1-5, a connector system 100 may provide a connection between a first device 101 and a second device 301. The connection system may include a first intermediate connector 102 that, for example, may be mounted to and or formed as a single component with the first device. In another example, the first intermediate connector 102 may be connected to a body of the first device 101 via any known fastener or series of fasteners or via an adhesive or ultrasonic welding, for example.

Figure 2:
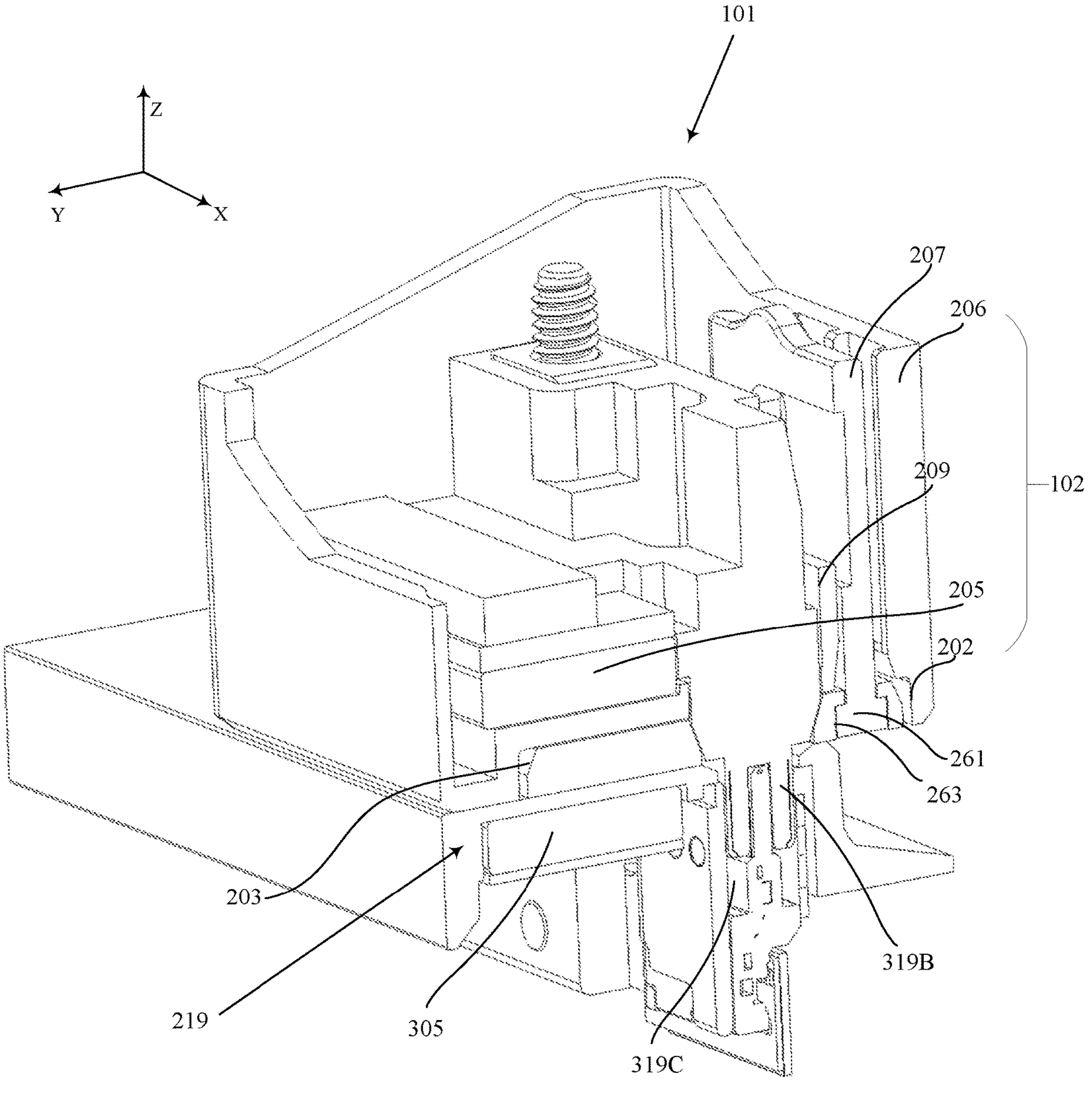
FIG. 2 is a partial cross sectional front perspective view of the connector assembly of FIG. 1 in accordance with one aspect of the disclosure.
Figure 3:
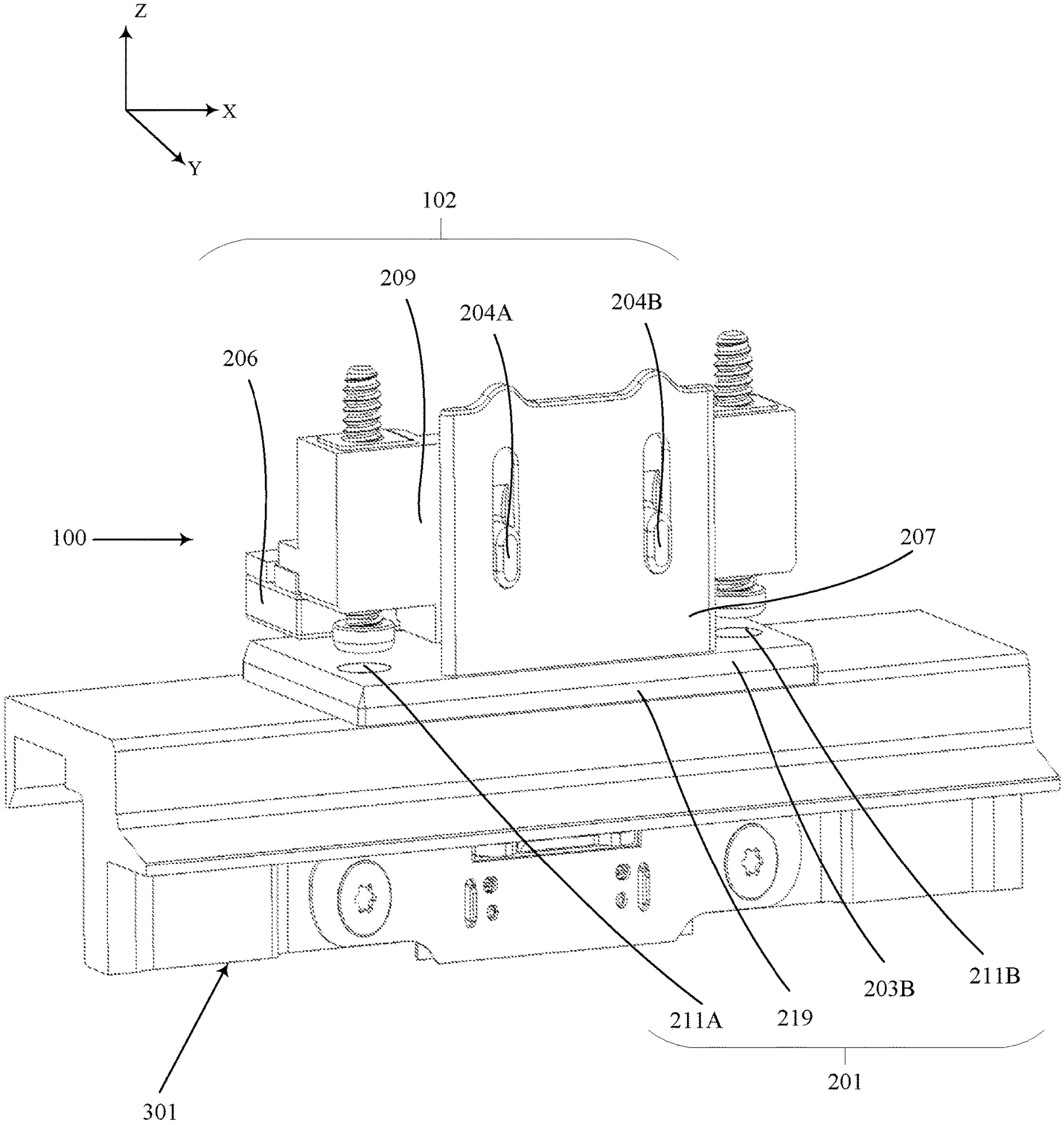
FIG. 3 is a rear perspective view of the connector assembly of FIGS. 1 and 2 with the body of the first intermediate connector removed in accordance with one aspect of the disclosure.
Figure 4:
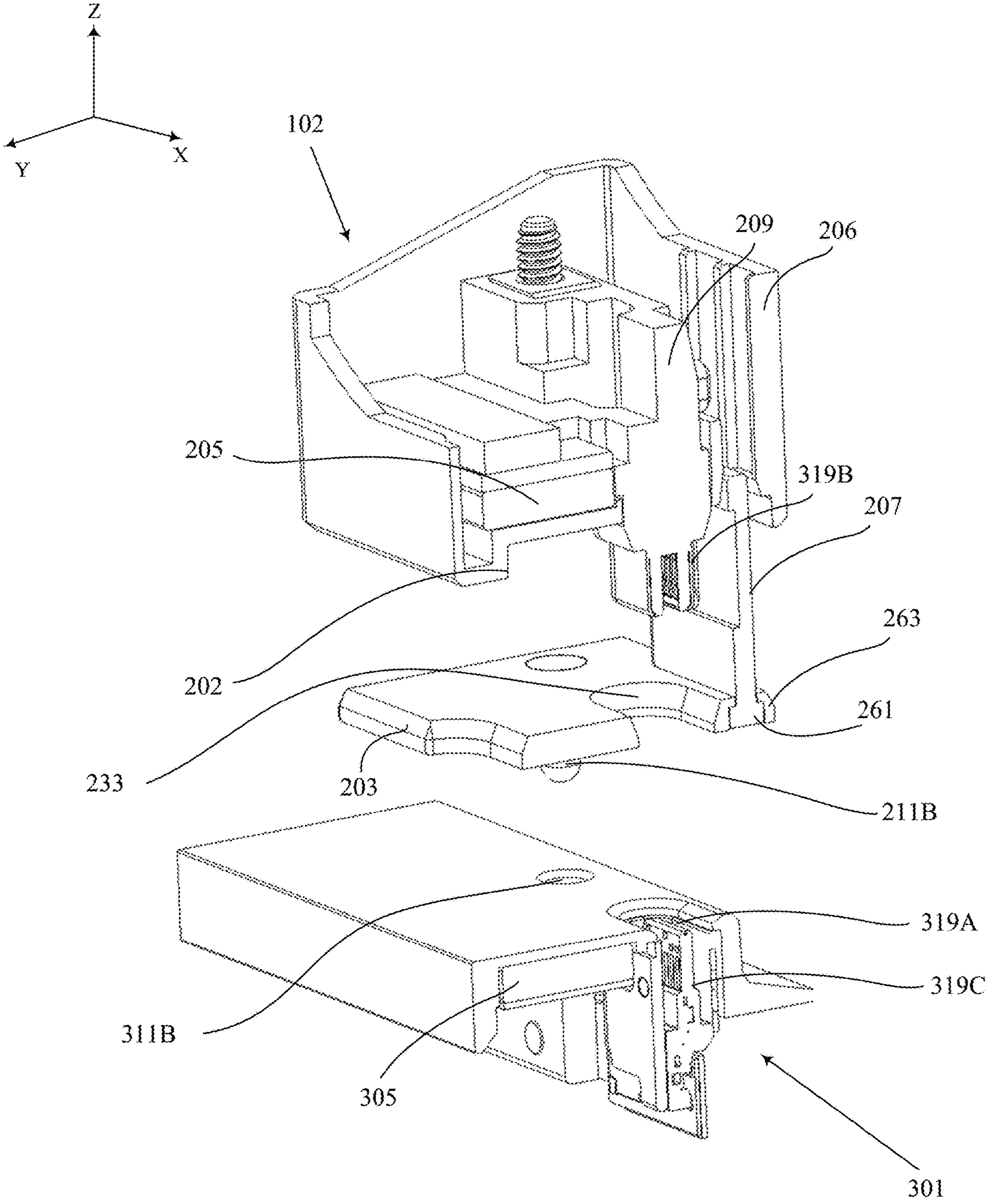
FIG. 4 is a front perspective cross sectional view of the connector assembly of FIGS. 1-3.
Figure 5:
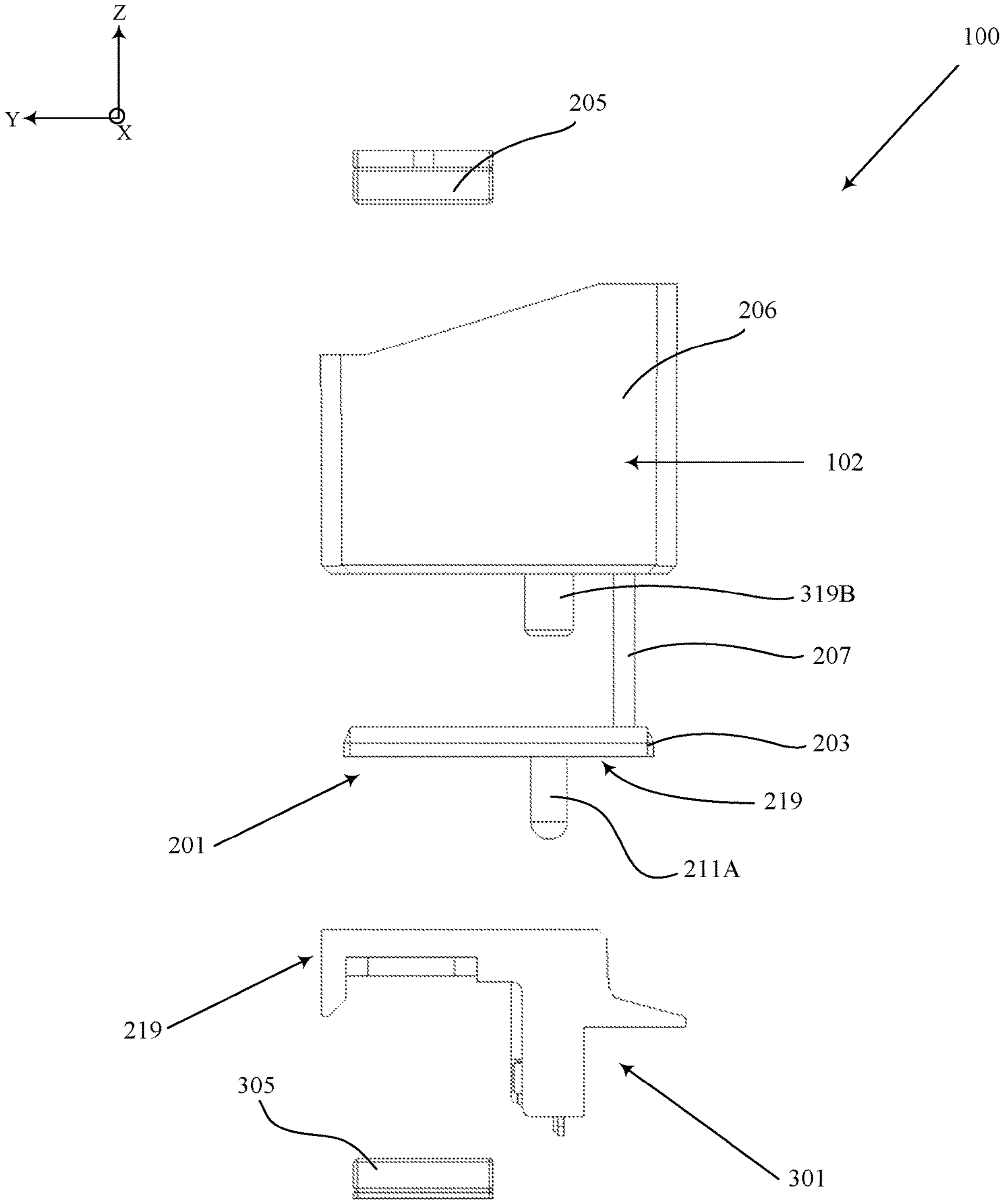
FIG. 5 a partially exploded side view of a connector assembly of FIGS. 1-4 in accordance with one aspect of the disclosure.

The first intermediate connector 102 may include a body 206 to which may be mounted a tether holder 209 that is configured to retain a tether 207. The first intermediate connector 102 may further include one or more interfaces for connecting to adjacent connectors or devices. In one implementation, for example, the first intermediate connector 102 may include a first connector interface 202, which in some cases may be partially concave, and which may be configured to receive a second connector interface 203, which in some cases may be partially convex. As shown in FIGS. 4 and 5, the first connector interface 202 and the second connector interface 203 may be separated. Further, as shown in FIGS. 1, 2, and 6, the second connector interface 203 may be configured to fit within the first connector interface 202.

With further reference to FIGS. 1-5, the connector system 100 may further comprise the tether 207 that connects the first intermediate connector 102 to the second intermediate connector 201. In one example, the tether 207 may be formed from a flexible or semi-flexible material, and, in some implementations, the tether 207 may be ribbon shaped. In the aforementioned example, the tether 207 may have a captive portion 263 (FIGS. 2 and 4) that is configured to fit within a tether opening 261. As shown in FIG. 5, the interface between captive portion 263 and the tether opening 261 causes a first end of the tether 207 to be retained within the second intermediate connector 201.

In some implementations, for example, a second end of the tether 207 may be slidably connected to the tether holder 209 of the first intermediate connector 102. In one example, in order to provide a slideable connection between the second end of the tether 207 and the first intermediate connector 102, the tether 207 may include a first slot 208A and/or a second slot 208B configured to be received by and slidably retained by a first slot retaining member 204A and/or a second slot retaining member 204B, respectively. Thus, when the first intermediate connector 102 is separated from the second intermediate connector 201, for example, in reaction to the first device 101 receiving a first force great enough to separate the first device 101 from the second device 301, the first slot 208A and/or the second slot 208B of the tether 207 slide with relation to the first slot retaining member 204A and/or the second slot retaining member 204B. The aforementioned sliding movement between the first slot 208A and/or the second slot 208B of the tether 207 with relation to the first slot retaining member 204A and/or the second slot retaining member 204B allows the separation of the first intermediate connector 102 from the second intermediate connector 201 while maintaining a connected tethered state between the second device 301 and the first device 101, e.g., via one or both ends of the tether 207 being constrained.

Figure 6:
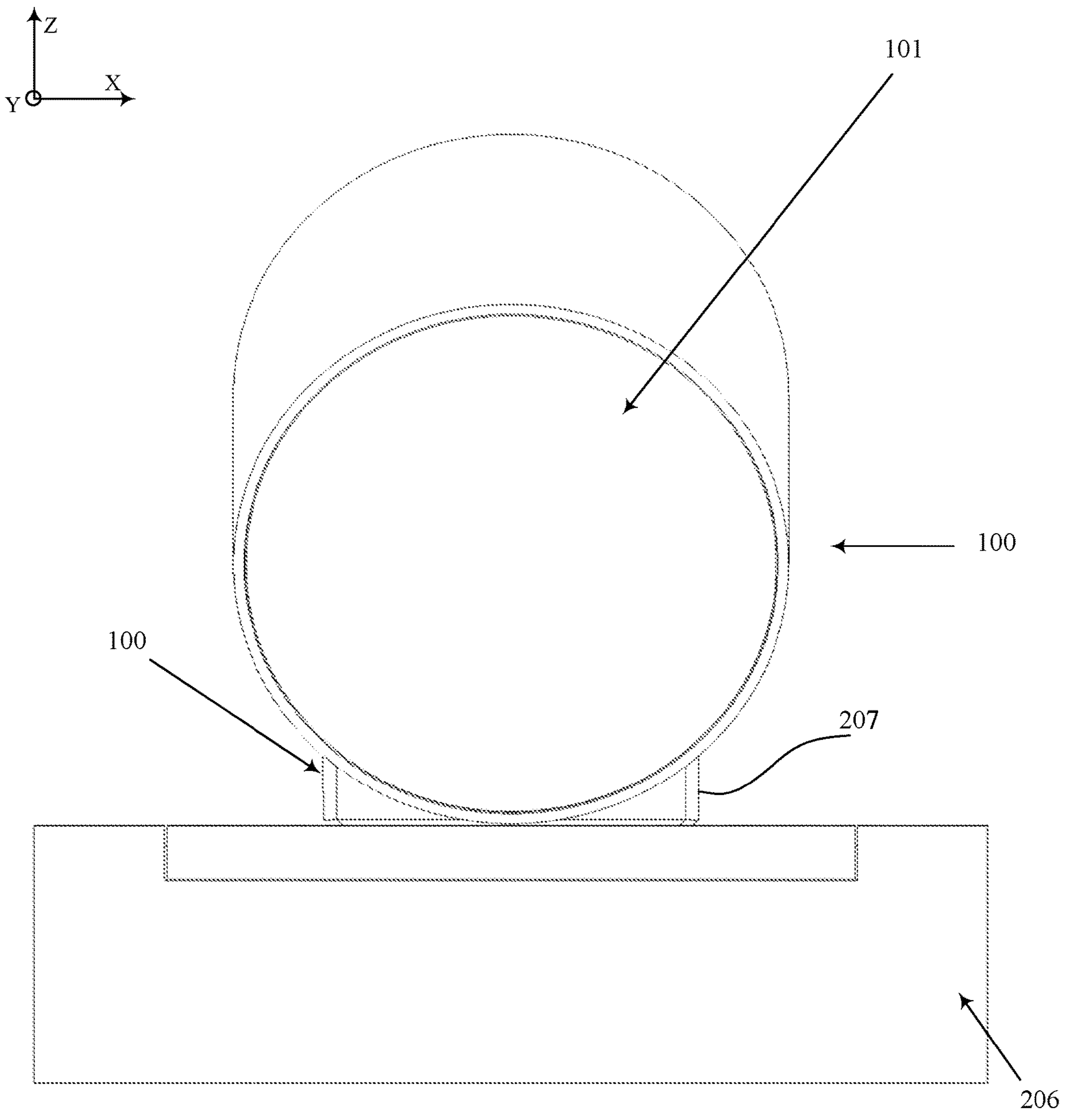
FIG. 6 is a front view of a connector assembly in a first position in accordance with one aspect of the disclosure.
Figure 7:
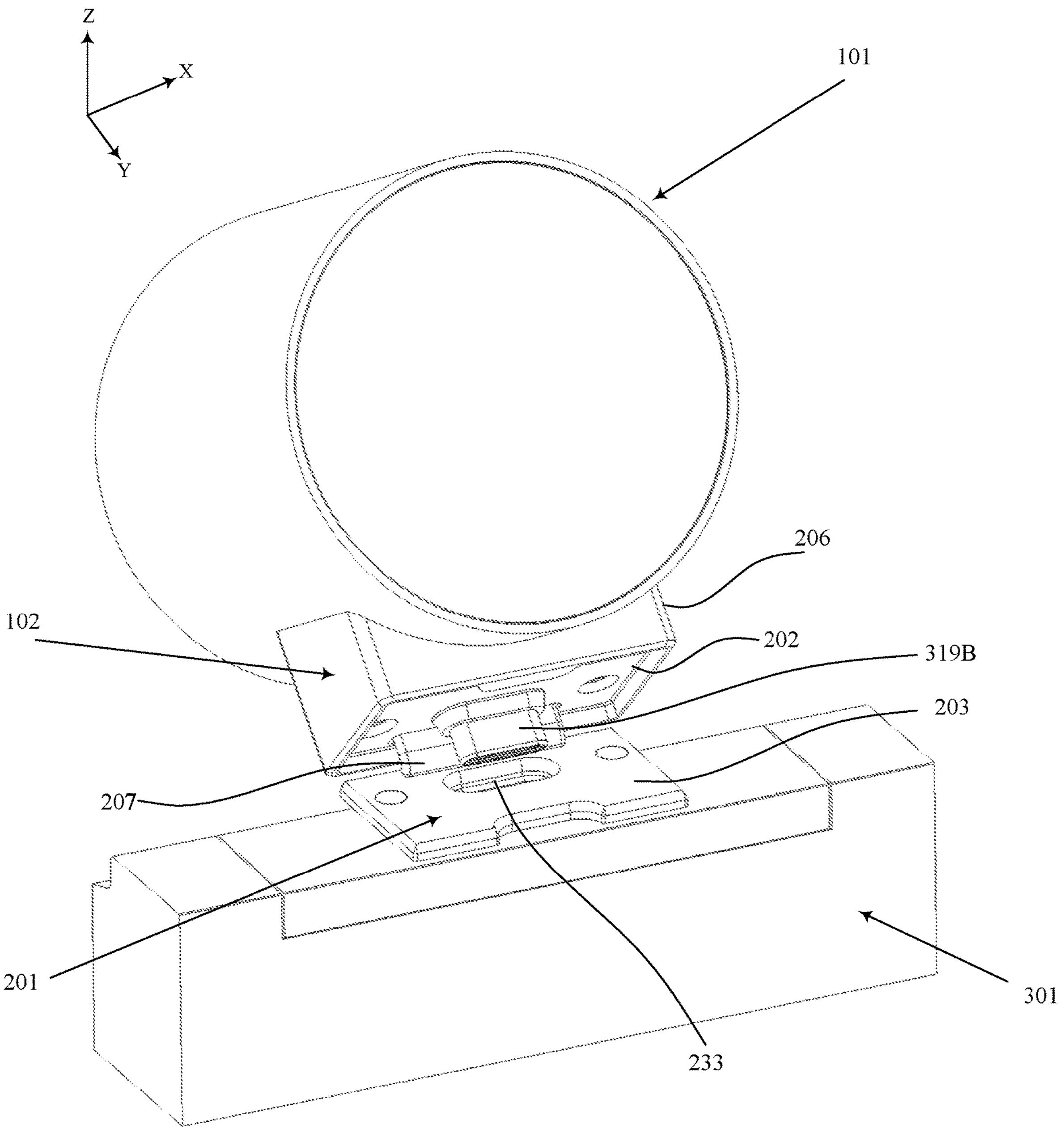
FIG. 7 is a front perspective view of the connector assembly of FIG. 6 in a second position in accordance with one aspect of the disclosure.
Figure 8:
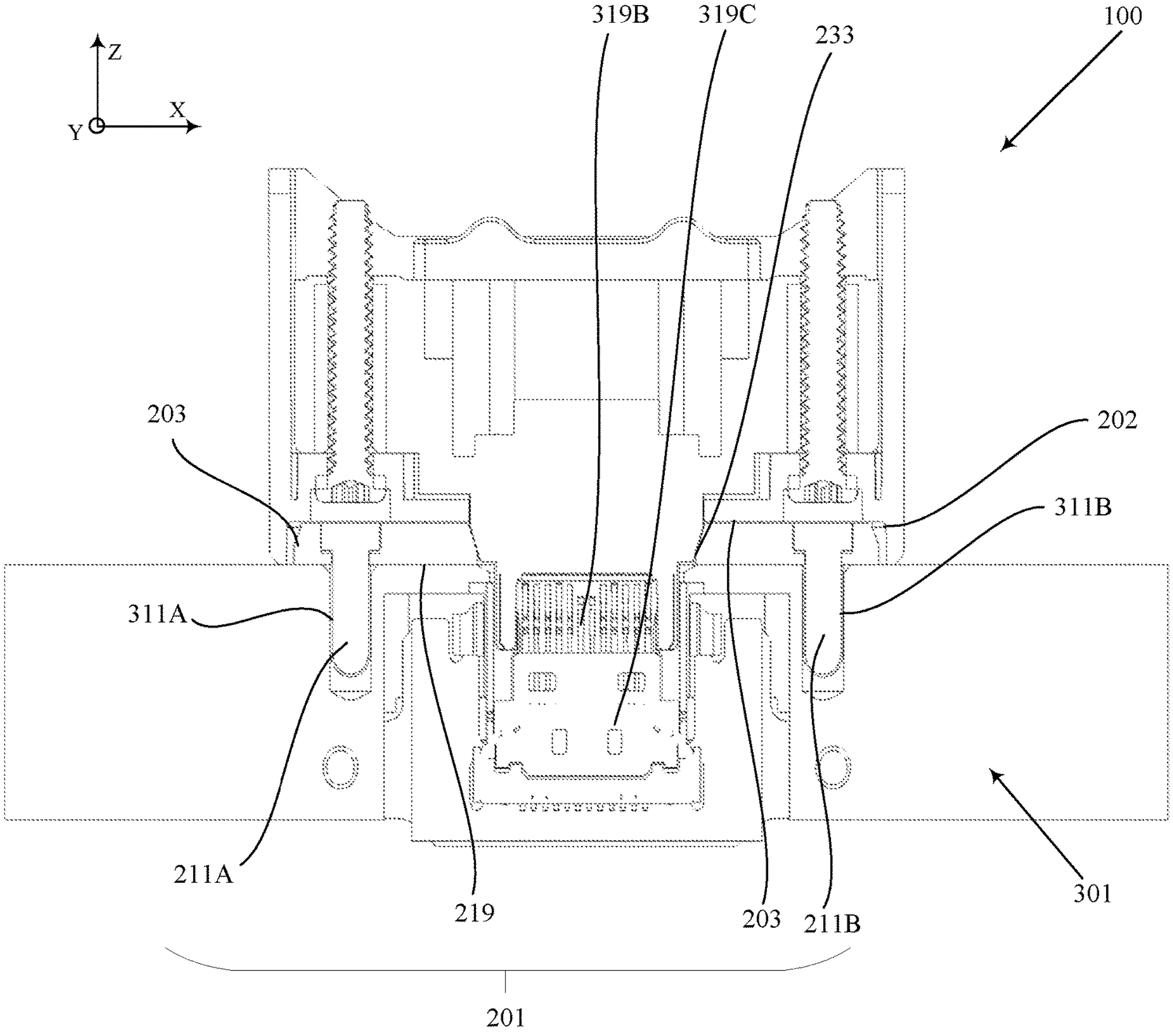
FIG. 8 is a cross section front view of a connector assembly in accordance with one aspect of the disclosure.
Figure 9:
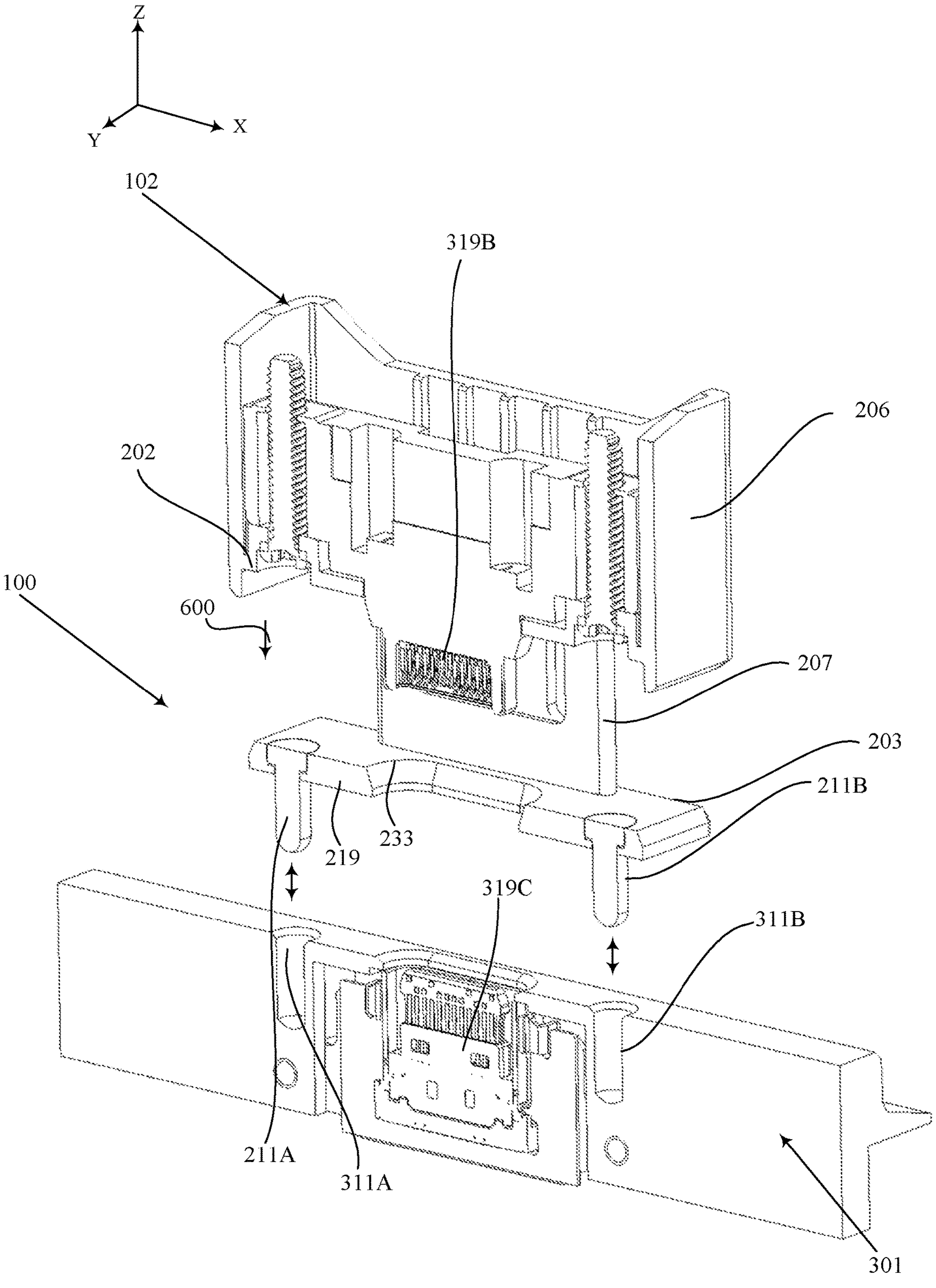
FIG. 9 is a cross sectional front view of the connector assembly of FIG. 8 in a second position in accordance with one aspect of the disclosure.
Figure 10:
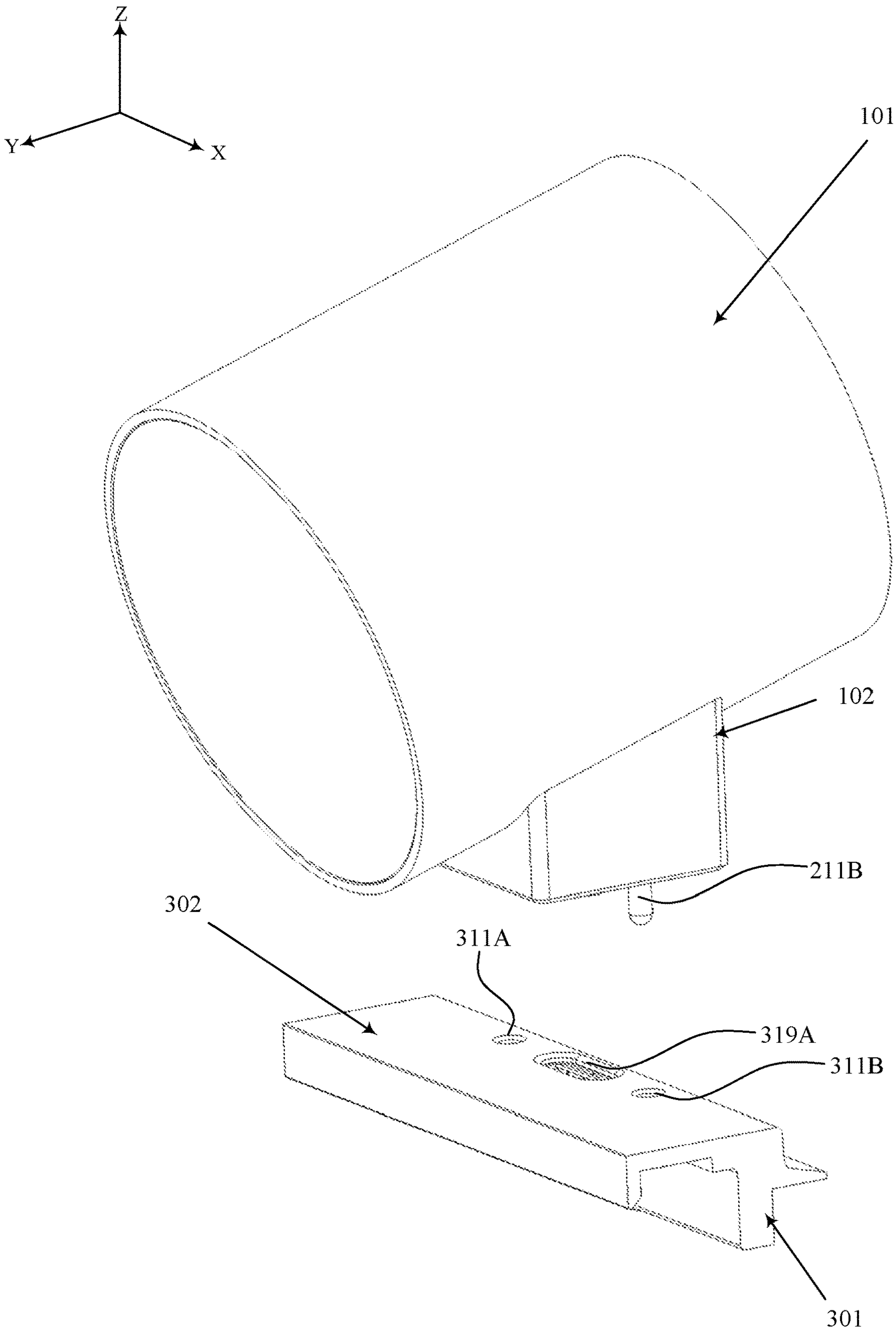
FIG. 10 is a front perspective view of the connector assembly of FIGS. 8 and 9 in a second position in accordance with one aspect of the disclosure.

Referring to FIGS. 6 and 7, one example of the tether 207 connects the first intermediate connector 102 with the second intermediate connector 201. When the first intermediate connector 102 and the second intermediate connector 201 are in an interfaced state (FIG. 6), the first intermediate connector 102 may be visible with the tether 207 and the second connector interface 203 contained within the first intermediate connector 102 and between the first device 101 and the second device 301. If a certain amount of force is applied to the first device 101, the first intermediate connector 102 and the second intermediate connector 201 may separate to a tethered state. As shown in FIG. 7, in the tethered state, the first device 101 follows a predetermined path that may cause the first device 101 to pivot backwards in the Y direction. Due to the outer dimensions and material qualities of tether 207, the tether 207 may control a path of the first device 101 while the first device 101 moves from the interfaced state to the tethered state. In the example shown in FIG. 7, for example, the tether 207 may control a path along at least an axis of either the first intermediate connector 102 or the second intermediate connector 201 during movement from the interfaced state to the tethered state, for instance, based on the ribbon shape and/or elastic characteristics of the tether 207. In one example, the tether 207 may control a path along at least one of the X axis or the Y axis, as referenced in FIG. 7. In another aspect, the tether 207 may control lateral movement of the first device 101 with respect to the second device 301 along the X axis direction as shown in FIG. 7.

Suitable examples of the tether 207 may include, but are not limited to, a molded member formed of flexible or semi-rigid material. Some example materials used to form the tether 207 may include, but are not limited to, at least one of: an elastomer, a rubber, or a silicone, or any other elastic material. Further, it is noted that while tether 207 is shown as a ribbon-shaped member throughout the figures, the tether 207 may also be formed as one or more strings, a cylinder, or a hollow tube.

Further, in one aspect, as an alternative to the sliding features discussed above, the tether 207 may be formed of a material that is sufficiently elastic to allow for the second intermediate connector 201 and the first intermediate connector 102 to be separated to the tethered state when enough force is applied to the first device 101. Further, the tether 207 may be configured to cause the second intermediate connector 201 and the first intermediate connector 102 to be return to the interfaced state when the force is removed. Thus, in some cases, the tether 207 may bias the first intermediate connector 102 to an interfaced state with the second intermediate connector 201.

Referring again to FIGS. 1-5, the first intermediate connector may further include a first magnet 205 (FIGS. 2-5) to provide additional biasing force to maintain (or return to) the interfaced state. The second intermediate connector 201 may be wholly or partially formed of a ferromagnetic material so that a magnetic attraction force between the first magnet 205 and the second intermediate connector 201 causes or biases the first connector interface 202 to contact the second connector interface 203. While in the aforementioned example, the first magnet 205 is within the first intermediate connector 102, it is noted that any arrangement that provides a magnetic attraction force between the first intermediate connector 102 and the second intermediate connector 201 may be used. For example, the second intermediate connector 201 may include a magnet and the first intermediate connector 102 may comprise a ferromagnetic material. As another example, the first intermediate connector 102 may include a magnet or plurality of magnets that have an opposite polarity from a corresponding magnet or plurality of magnets at the second intermediate connector 201. A magnet, as referenced in the current disclosure, may include any suitable magnet; for example, a magnet may include a single or plurality of magnets comprising: a neodyum iron boron magnet, a samarium cobalt magnet, a ceramic magnet, a ferrite magnet, and/or a rare-earth magnet.

Turning to FIGS. 4, 5, and 8-12, in one example, the second intermediate connector 201 may include a device interface to guide or to enhance a connection to the second device 301. For instance, the device interface may include a single or plurality of received portions(s) 211A and/or 211B. In one example implementation, the device interface of the second intermediate connector 201 may include a first received portion 211A and a second received portion 211B. As shown in FIGS. 2, 8, 9, and 10, in one example, the first received portion 211A and the second received portion 211B may be shaped as pins or cylinders that are configured to be received by a corresponding first receiving portion 311A and second receiving portion 311B at a second device interface 302 of the second device. In one example implementation, the interaction between the first received portion 211A and first receiving portion 311A, and the interaction between the second received portion 211B and the second receiving portion 311B serves to guide or locate the first intermediate connector 102 of the first device 101 with respect to the second device interface 302 of the second device. In another example implementation, the interaction may provide additional retaining force to help maintain the connection between the components.

Referring back to FIGS. 2, 4, and 5, the second device interface 302 of the second device may include a second magnet 305 to enhance or bias the connection between the components. The second intermediate connector 201 may be wholly or partially formed of a ferromagnetic material so that a magnetic attraction force between the second magnet 305 and the second intermediate connector 201 causes the device interface 219 to mate with and contact the second device interface 302. Although, in the aforementioned example, the second magnet 305 is within the second device 301 within the vicinity of the second device interface, it is noted that any arrangement that provides a magnetic attraction force between the second device interface 302 and the second intermediate connector 201 may be used. For example, the second intermediate connector 201 may include a magnet and the second device interface 302 may include a ferromagnetic material. As another example, the second device interface 302 may include a magnet or plurality of magnets that have an opposite polarity as a respective magnet or plurality of magnets at the second intermediate connector 201.

Referring to FIGS. 2, 4, 5, and 8-12, the interaction between the received portions 211A/B and the receiving portions 311A/B, and/or the magnetic attraction force between the second intermediate connector 201 and the second device interface 302 may allow the first device 101 to be connected and/or disconnected from the second device 301. Further, the aforementioned features may be configured to allow the first device 101 to completely separate from the second device 301 via an interface between the second intermediate connector 201 and the second device interface 302 when a second force is applied to the first device. This separation may provide additional assurance to a user that the first device will separate from the second device, for example, instead of breaking.

For instance, in an implementation, the first intermediate connector 102 may be configured to separate from the second intermediate connector 201, for example, in reaction to the first device 101 receiving a first force great enough to separate the first device 101 from the second device 301. In one example implementation, the second intermediate connector 201 is separable from the second device interface 302 via a second force and the first intermediate connector 102 is moveable from the interfaced state to the tethered state via a first force, and the second force is greater than the first force. In one example, the second force may be between 45% and 65% greater than the first force. In another example, the second force may be approximately 50% greater than the first force. Thus, the disclosed connector system 100 allows for the first device 101 to be removable from the second device 301, while still providing the reassurance of the tether 207 between the first device 101 and the second device 301.

Figure 11:
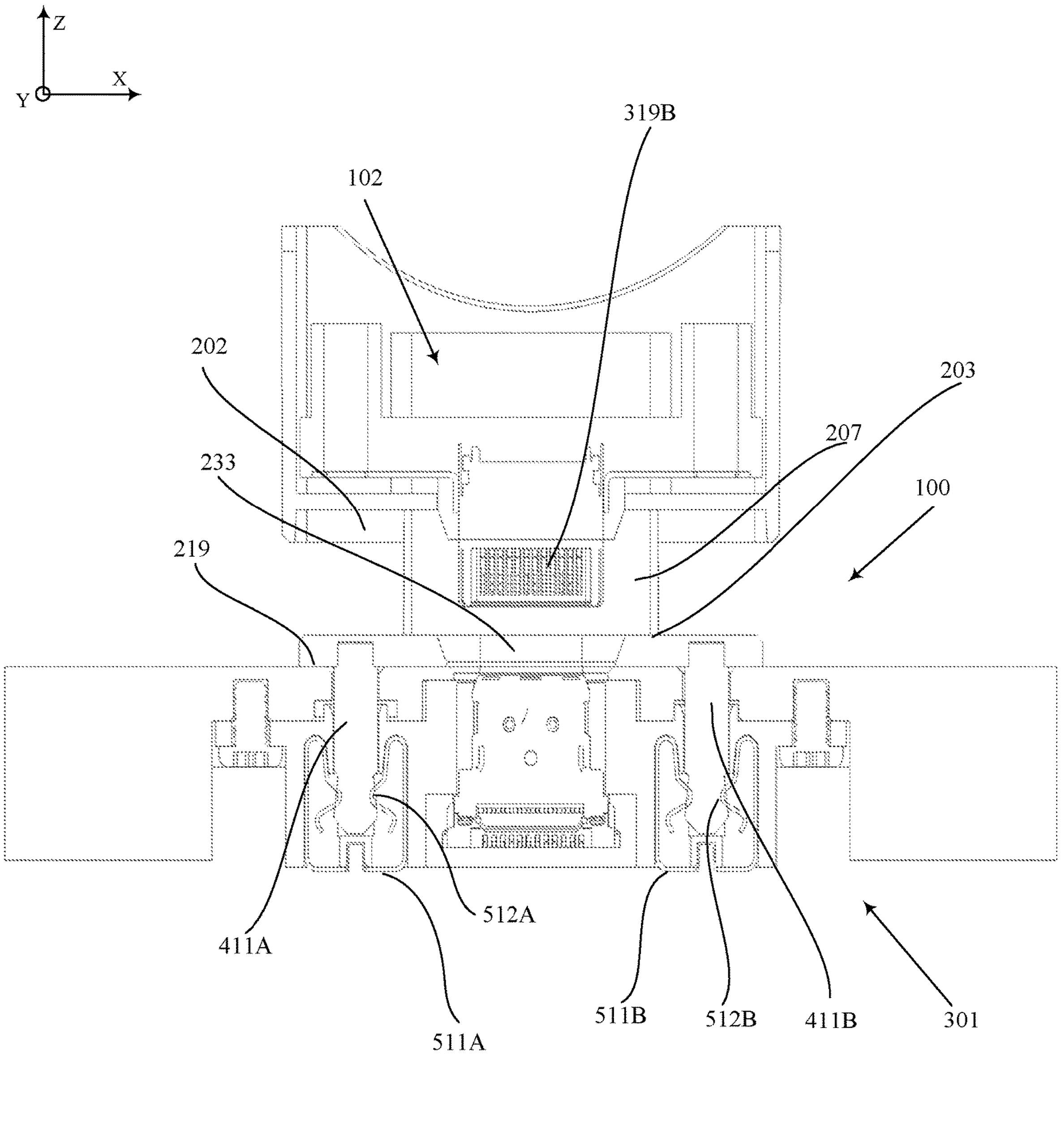
FIG. 11 is a cross sectional front view of a connector assembly in a first position in accordance with one aspect of the disclosure.
Figure 12:
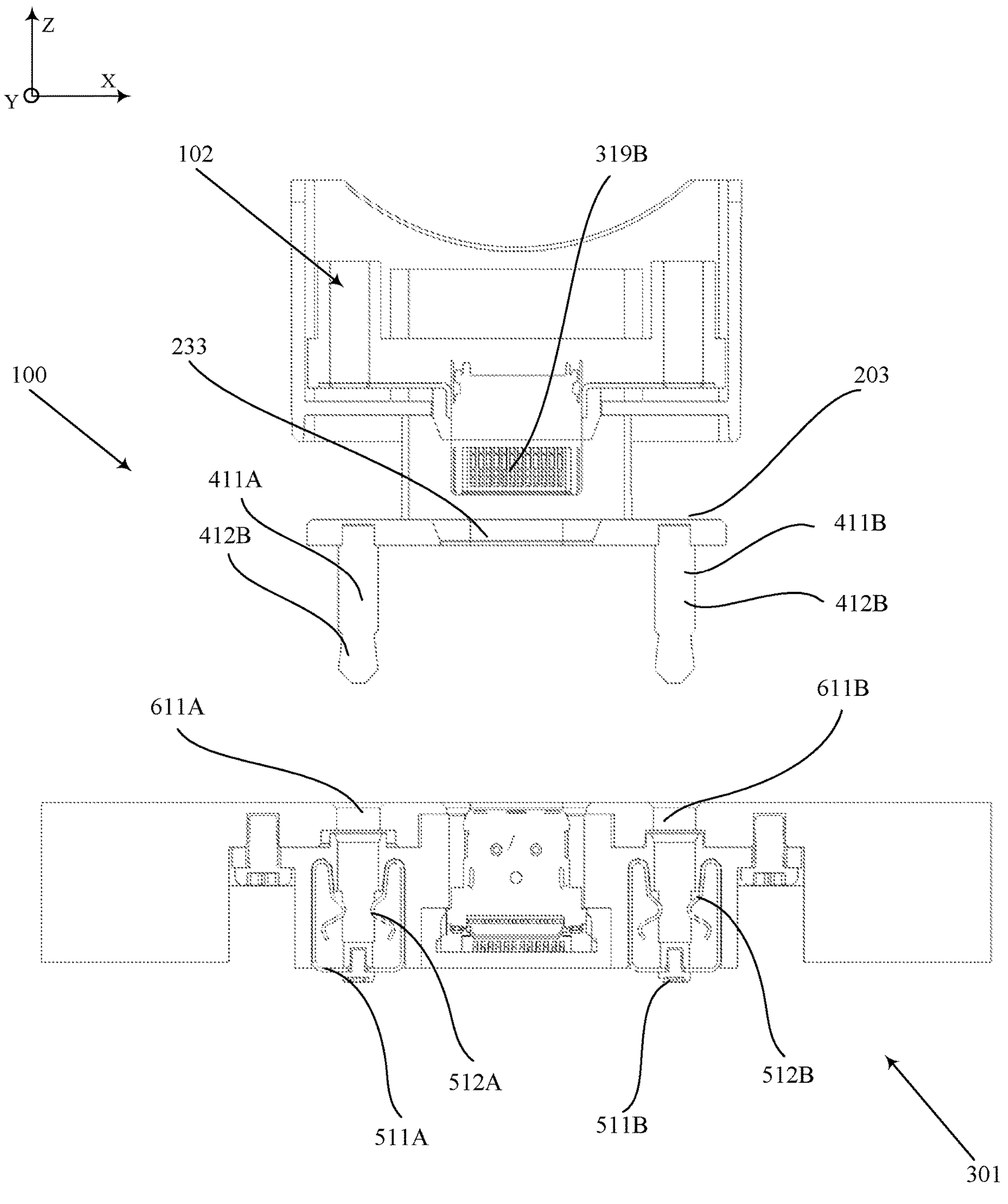
FIG. 12 is a cross sectional front view of the connector assembly of FIG. 11 in a second position in accordance with one aspect of the disclosure.

Referring to FIGS. 11 and 12, an alternative connector system to the examples outlined with respect to FIGS. 1-10 above is shown. The connector system includes a number of similar components to those described with respect to the connector system in FIGS. 1-10 above but further includes an additional retaining interface for retaining received portions 411A and/or 411B. For the sake of simplicity, in FIGS. 11 and 12, components that may be identical or similar to those outlined with respect to FIGS. 1-10 have been given the same reference numbers. The second intermediate connector 201 may include, for example, a device interface connectable to the second device 301. The device interface may include a single or plurality of received portions(s) 611A and/or 611B. In one example implementation, the device interface of the second intermediate connector 201 may include a first received portion 411A and a second received portion 411B. The first received portion 411A and the second received portion 411B may be shaped as pins or cylinders that are configured to be received by a corresponding first receiving portion 511A and second receiving portion 511B at a second device interface 302 of the second device. However, unlike the first received portion 211A and second received portion 211B of FIGS. 1-10, the first received portion 411A and the second received portion 411B include respective locking portions 412A and 412B. Locking portions 412A and 412B may be formed as grooves that are configured to mate and interlock with respective locking springs 512A and 512B within the first and second first receiving portions 411A and 411B. The contact between the locking springs 512A and 512B and locking portions 412A and 412B of the received portions 411A and 411B may further secure the second intermediate connector 201 to the second device interface 302. Thus, in one example implementation, the interface between the second device interface 302 and the second intermediate connector 201 may be sufficiently strong so that the second magnet 305 may be omitted.

Figure 13:
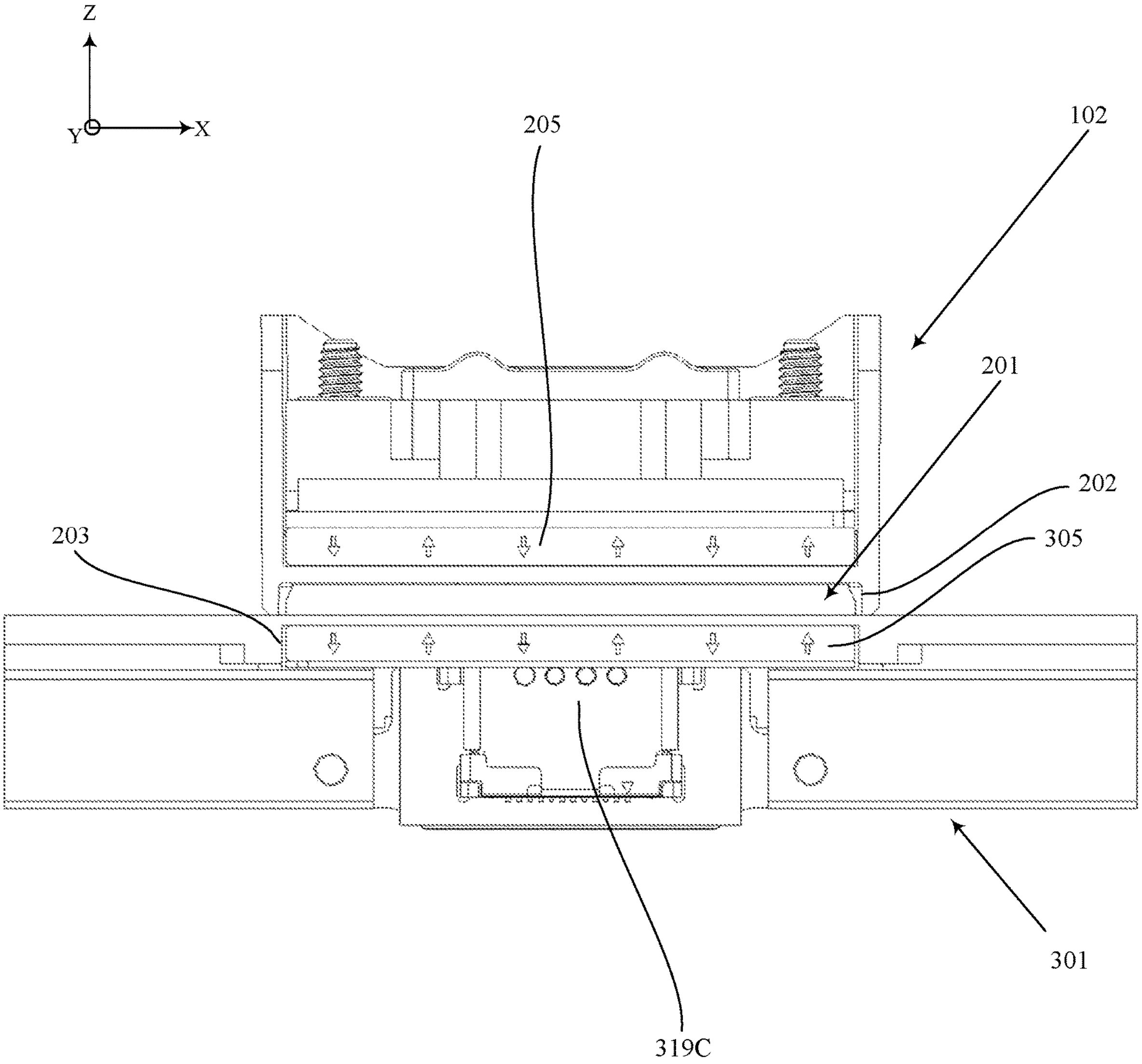
FIG. 13 is a cross sectional front view of a connector assembly in accordance with one aspect of the disclosure.

As shown in FIG. 13, the received portions may be omitted and second intermediate connector 201 may be connectable to the second device interface 302 via a magnetic force from a second magnet 305, or the other alternative configurations the provide a magnetic attraction force between the second intermediate connector 201 and the second device interface 302 as discussed above.

In one example implementation, the interaction between the first received portion 211A and first receiving portion 311A, and the interaction between the second received portion 211B and the second receiving portion 311B, serves to guide or locate the first intermediate connector 102 of the first device 101 with respect to the second device interface 302 of the second device.

Turning to FIGS. 2, 4, 5, and 7-13, the disclosed system may further include an electrical connector for exchanging signals and/or power between the first device 101 and the second device 301. In one example implementation, the first device 101 may include a first electrical connector 319B. The first electrical connector 319B may be configured to interface with and form an operative connection with a second electrical connector 319C via an opening 319A at the second device 301. When the first device 101 is mounted to the second device 301, the electrical connector may pass through an aperture 233 in the second intermediate connector 201. As shown in FIG. 7, the first electrical connector 319B and second electrical connector 319C may be configured to disconnect when the first intermediate connector 102 and the second intermediate connector 201 is moved from the interfaced state to the tethered state. Further, the aforementioned structure and sliding configuration of tether 207 may provide a controlled disconnect path between the first electrical connector 319B and second electrical connector 319C, which may help to prevent damage to the first electrical connector 319B and/or the second electrical connector 319C when the first intermediate connector and the second intermediate connector move from the interfaced state to the tethered state. In another aspect, the tether 207 may be structured so as to optimize the disconnect path based on the structure of the first electrical connector 319B and second electrical connector 319C (FIG. 2).

Further, referring to FIGS. 4, 5, 9, 10, and 12, the first electrical connector 3198 and second electrical connector 319C may also be configured to disconnect when the second intermediate connector 201 and the second device interface 302 are separated.

In another alternative aspect, the tether 207 and/or a portion of tether 207 may include a cable capable of transmitting electrical signals between the first device 101 and the second device 301. First electrical connector 319B may be in signal communication with the cable and connected to the second intermediate connector 201. Thus, in the aforementioned alternative aspect, the first electrical connector 319B may be configured to provide an electrical connection between the first device 101 and the second device 301 when the first intermediate connector 102 and the second intermediate connector 201 are in the tethered state, and may be configured to disconnect the electrical connection between the first device 101 and the second device 301 when the second device interface 302 and the device interface 219 are in the separated state.

The aforementioned first electrical connector 319B and/or second electrical connector 319C may include any suitable connector for transmitting signals and/or for providing current. Some examples may include a USB-C connector interface, a micro-USB interface, a USB-A interface, a mini-USB interface, a DisplayPort interface, a mini-DisplayPort interface, or an HDMI interface, to name a few examples. Further, while throughout the specification an electrical connection is referenced, the aforementioned first electrical connector 319B and/or second electrical connector 319C may include a fiber-optic or other optical link.

The foregoing description of various aspects and examples have been presented for purposes of illustration and description. It is not intended to be exhaustive nor to limit the disclosure to the forms described. The embodiment (s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. An assembly for mounting an electronic accessory to a second device, comprising:

a first intermediate connector associated with the electronic accessory and having a first connector interface;

a second intermediate connector having a second connector interface and a device interface connectable to a second device interface of the second device and having a connected state and a separated state, wherein the device interface contacts the second device interface in the connected state and is independent of the second device interface in the separated state, wherein the first intermediate connector and the second intermediate connector are movable between an interfaced state in which the first connector interface is in contact with the second connector interface while in the connected state and a tethered state in which the first connector interface is spaced apart from the second connector interface while in the connected state; and a tether member with a first end affixed to the second intermediate connector and a second end affixed to the first intermediate connector and connecting the first intermediate connector and the second intermediate connector in the tethered state, wherein the tether member is configured to control a path along at least an axis of either the first intermediate connector or the second intermediate connector during movement from the interfaced state to the tethered state, wherein the tether member is configured to prevent the electronic accessory from falling-off of the second device.

2. The assembly of claim 1, wherein the second intermediate connector is associated with the second device.

3. The assembly of claim 1, wherein the first intermediate connector is moveable from the interfaced state to the tethered state via a first force, and the second intermediate connector is separable from the second device interface via a second force, wherein the second force is greater than the first force.

4. The assembly of claim 1, wherein at least one of the device interface and the second device interface comprise at least one magnet, and the second intermediate connector is connected to second device via a magnetic attraction between the device interface and second device interface.

5. The assembly of claim 1, wherein the device interface further comprises a protruding received portion, wherein the protruding received portion is received by a corresponding receiving portion at the second device interface.

6. The assembly of claim 1, further comprising an electrical connector, wherein the electrical connector is configured to provide an electrical connection between the electronic accessory and the second device when first intermediate connector and the second intermediate connector are in the interfaced state and the second device interface and the device interface are in the connected state.

7. The assembly of claim 6, wherein the electrical connector is configured to provide an electrical connection between the electronic accessory and the second device when the first intermediate connector and the second intermediate connector are in the tethered state, and disconnect the electrical connection between the electronic accessory and the second device when the second device interface and the device interface are in the separated state.

8. The assembly of claim 6, wherein the electrical connector is configured to disconnect the electrical connection between the electronic accessory and the second device when the first intermediate connector and the second intermediate connector are in the tethered state or when the second device interface and the device interface are in the separated state.

9. The assembly of claim 1, wherein at least one of the first intermediate connector and the second intermediate connector comprises at least one magnet, wherein the first intermediate connector and the second intermediate connector are held in the interfaced state via a magnetic attraction due to the at least one magnet.

10. The assembly of claim 1, wherein the first intermediate connector is the electronic accessory.

11. The assembly of claim 1, wherein the first intermediate connector is connected to the electronic accessory.

12. The assembly of claim 1, wherein the tether member is slidably connected to at least one of the first intermediate connector and the second intermediate connector.

13. The assembly of claim 1, wherein the tether member is contained within the first intermediate connector and the second intermediate connector when the first intermediate connector and the second intermediate connector are in the interfaced state.

14. The assembly of claim 1, wherein the second connector interface of the second intermediate connector is configured to fit within the first connector interface of the first intermediate connector.

15. The assembly of claim 1, wherein the tether member is contained within the first intermediate connector.

16. The assembly of claim 1, wherein the electronic accessory is a camera.

17. The assembly of claim 1, wherein the tether member is a flexible body formed of a flexible material.

18. An assembly, comprising:

a first intermediate connector associated with an electronic accessory and having a first connector interface;

a second intermediate connector associated with a second device and having a second connector interface and a device interface connectable to a second device interface of the second device and having a connected state and a separated state, wherein the device interface contacts the second device interface in the connected state and is independent of the second device interface in the separated state;

wherein the first intermediate connector and the second intermediate connector are movable between an interfaced state in which the first connector interface is in contact with the second connector interface and a tethered state in which the first connector interface is spaced apart from the second connector interface;

an electrical connector, wherein the electrical connector is configured to provide an electrical connection between the electronic accessory and the second device when first intermediate connector, and the second intermediate connector are in the interfaced state and the second device interface, and the device interface are in the connected state; and a tether member with a first end affixed to second intermediate connector and a second end affixed to the first intermediate connector and connecting the first intermediate connector and the second intermediate connector in the tethered state, wherein the tether member is a flexible body formed of a flexible material and configured to control a path along at least an axis of either the first intermediate connector or the second intermediate connector during movement from the interfaced state to the tethered state wherein the second intermediate connector further comprises an aperture allowing the electrical connector to pass therethrough from the electronic accessory to the second device, and wherein the electrical connector is configured to disconnect the electrical connection between the electronic accessory and the second device when the first intermediate connector and the second intermediate connector are in the tethered state or when the second device interface and the device interface are in the separated state.

19. A connector for removably mounting an electronic accessory to a second device, the connector comprising:

a first intermediate connector member associated with the electronic accessory and having a first connector interface;

a second intermediate connector associated with a second device and having a second connector interface and a device interface;

wherein the first intermediate connector member and the second intermediate connector are movable between an interfaced state in which the first connector interface is in contact with the second connector interface, and a tethered state in which the first connector interface is spaced apart from the second connector interface;

a tether member affixed to the first intermediate connector member and the second intermediate connector in the tethered state; and a second device interface, wherein the device interface is connectable to the second device interface of the second device and having a connected state and a separated state, wherein the device interface contacts the second device interface in the connected state and is independent of the second device interface in the separated state and wherein at least one of the device interface and the second device interface comprise at least one magnet and the second intermediate connector is connected to the second device via a magnetic attraction between the device interface and the second device interface to mount the electronic accessory to the second device.

20. The connector of claim 19, wherein the first intermediate connector member is moveable from the interfaced state to the tethered state via a first force, and the second intermediate connector is separable from the second device interface via a second force, wherein the second force is greater than the first force.

21. The connector of claim 19, wherein the first intermediate connector member is the electronic accessory, wherein the electronic accessory is electrically connected to the second device via a connector that passes through an aperture in the second intermediate connector.

22. The connector of claim 19, wherein the electronic accessory is a camera.

* * * * *